(12) United States Patent
Teyeb et al.

(10) Patent No.: US 12,294,902 B2
(45) Date of Patent: *May 6, 2025

(54) TRAFFIC STEERING FROM A FIRST ACCESS NETWORK TO A SECOND ACCESS NETWORK

(71) Applicant: Telefonaktiebolaget LM Ericsson (publ), Stockholm (SE)

(72) Inventors: Oumer Teyeb, Solna (SE); Ruth Guerra, Stockholm (SE); Christofer Lindheimer, Linköping (SE); Filip Mestanov, Sollentuna (SE); Elena Myhre, Järfälla (SE); Håkan Persson, Solna (SE); Magnus Stattin, Upplands Väsby (SE); Mattias Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 797 days.

This patent is subject to a terminal disclaimer.

(21) Appl. No.: 17/536,420

(22) Filed: Nov. 29, 2021

(65) Prior Publication Data

US 2022/0086712 A1    Mar. 17, 2022

Related U.S. Application Data

(63) Continuation of application No. 14/888,896, filed as application No. PCT/SE2014/050060 on Jan. 20, 2014, now Pat. No. 11,218,928.

(Continued)

(51) Int. Cl.
*H04W 36/00* (2009.01)
*H04W 36/22* (2009.01)
(Continued)

(52) U.S. Cl.
CPC ... *H04W 36/0088* (2013.01); *H04W 36/0058* (2018.08); *H04W 36/22* (2013.01); *H04W 84/12* (2013.01); *H04W 88/06* (2013.01)

(58) Field of Classification Search
CPC ......... H04W 36/0088; H04W 36/0058; H04W 36/22; H04W 84/12; H04W 88/06
See application file for complete search history.

(56) References Cited

U.S. PATENT DOCUMENTS 8,121,607 B2    2/2012    Fang et al.
8,504,056 B2    8/2013    Fang et al.
(Continued)

FOREIGN PATENT DOCUMENTS

AU    2012205224 A1    8/2012
CN    1479491 A    3/2004
(Continued)

OTHER PUBLICATIONS

"3GPP TS 36.331 V11.1.0", 3rd Generation Partnership Project; Technical Specification Group Radio Access Network; Evolved Universal Terrestrial Radio Access (E-UTRA); Radio Resource Control (RRC); Protocol specification (Release 11), Sep. 2012, pp. 1-325.

(Continued)

*Primary Examiner* — Walli Z Butt
*Assistant Examiner* — Margaret Marie Anderson
(74) *Attorney, Agent, or Firm* — Murphy, Bilak & Homiller, PLLC

(57) ABSTRACT

Embodiments include methods for a network node of a 3GPP RAN. Such methods include determining a configuration that enables a UE to steer the UE's traffic between the 3GPP RAN and a WLAN without receiving a traffic steering command from the 3GPP RAN. The configuration includes a forward traffic steering configuration comprising a first (Continued)

plurality of thresholds/conditions for which the UE, when connected to 3GPP RAN, can initiate steering at least some of the UE's traffic from 3GPP RAN to WLAN; and a backward traffic steering configuration comprising a second plurality of thresholds/conditions for which the UE, when connected to WLAN, can initiate steering at least some of the UE's traffic from WLAN to 3GPP RAN. The backward traffic steering configuration includes threshold(s)/condition(s) based on different values of a same parameter as threshold(s)/condition(s) of the forward traffic steering configuration. The configuration is sent to the UE in a single message.

24 Claims, 10 Drawing Sheets

Related U.S. Application Data

(60) Provisional application No. 61/819,949, filed on May 6, 2013.

(51) Int. Cl.
*H04W 84/12* (2009.01)
*H04W 88/06* (2009.01)

(56) References Cited

U.S. PATENT DOCUMENTS

| | | | |
|---|---|---|---|
| 9,681,334 | B2 | 6/2017 | Nylander et al. |
| 11,218,928 | B2 * | 1/2022 | Teyeb .................... H04W 36/22 |
| 2004/0044887 | A1 | 3/2004 | Park et al. |
| 2005/0176469 | A1 | 8/2005 | Stern-Berkowitz et al. |
| 2007/0218906 | A1 | 9/2007 | Melia et al. |
| 2008/0095119 | A1 | 4/2008 | Bachmann et al. |
| 2010/0056157 | A1 | 3/2010 | Verona et al. |
| 2011/0134882 | A1 | 6/2011 | Aoyama et al. |
| 2012/0315905 | A1 | 12/2012 | Zhu et al. |
| 2013/0003918 | A1 | 1/2013 | Takayama |
| 2014/0153511 | A1 | 6/2014 | Sirotkin et al. |
| 2014/0328193 | A1 | 11/2014 | Horn et al. |
| 2015/0358884 | A1 | 12/2015 | Nagasaka et al. |
| 2015/0382269 | A1 | 12/2015 | Liang |
| 2016/0007268 | A1 | 1/2016 | Jung et al. |
| 2016/0029295 | A1 | 1/2016 | Nagasaka et al. |
| 2016/0073297 | A1 | 3/2016 | Hwang et al. |
| 2016/0373952 | A1 | 12/2016 | Lee et al. |

FOREIGN PATENT DOCUMENTS

| | | |
|---|---|---|
| CN | 101036356 A | 9/2007 |
| CN | 101039236 A | 9/2007 |
| CN | 101193448 A | 6/2008 |
| CN | 101547467 A | 9/2009 |
| CN | 101572924 A | 11/2009 |
| CN | 101904201 A | 12/2010 |
| CN | 102448143 A | 5/2012 |
| CN | 102595544 A | 7/2012 |
| EP | 2239953 A1 | 10/2010 |
| EP | 2355581 A1 | 8/2011 |
| EP | 2381720 A2 | 10/2011 |
| WO | 2008017709 A1 | 2/2008 |
| WO | 2012110420 A1 | 8/2012 |

OTHER PUBLICATIONS

"3GPP TS 25.331 V11.5.0", 3rd Generation Partnership Project; Technical Specification Group Radio Access Network; Radio Resource Control (RRC); Protocol specification (Release 11), Mar. 2013, pp. 1-2079.

"Analysis of WLAN/3GPP interworking solutions", 3GPP TSG-RAN WG2 #81bis, Tdoc R2-131388, Ericsson, ST-Ericsson, Deutsche Telekom, Chicago, IL, USA, Apr. 15-19, 2013, pp. 1-3.

"Load balancing between 3GPP and WLAN", 3GPP TSG-RAN2 Meeting #81bis; R2-131181; Chicago, IL, USA, Apr. 2013, pp. 1-9.

"Way forward for WLAN/3GPP Radio interworking", Ericsson, ST-Ericsson, 3GPP TSG-RAN WG2 #83, Tdoc R2-132827, Barcelona, Spain, Aug. 19-23, 2013, pp. 1-8.

"WLAN/3GPP access network selection based on maximum achievable rate metric", Intel Corporation, 3GPP TSG RAN2 Meeting #81 bis, R2-131348, Chicago, USA, Apr. 15-19, 2013, pp. 1-8.

* cited by examiner

TRAFFIC STEERING FROM A FIRST ACCESS NETWORK TO A SECOND ACCESS NETWORK

CROSS-REFERENCE TO RELATED APPLICATION(S)

This application is a continuation of and claims the benefit of priority from U.S. patent application Ser. No. 14/888,896 filed on Nov. 3, 2015, which is a U.S. national-stage entry of international application PCT/SE2014/050060 filed on Jan. 20, 2014, which claims the benefit of priority from U.S. Provisional Patent Application 61/819,949 filed May 6, 2013. The entire disclosures of the above-mentioned applications are incorporated herein by reference for all purposes.

TECHNICAL FIELD

The present disclosure is generally related to wireless communications systems, and is more particularly related to techniques for controlling the operation of mobile terminals with respect to the use of multiple radio access technologies, such as a wide area wireless communication technology and a wireless local area network (WLAN) technology.

BACKGROUND

The wireless local-area network (WLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). As currently specified, Wi-Fi systems are primarily operated in the 2.4 GHz or 5 GHz bands.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Using Wi-Fi/WLAN (the two terms are used interchangeably throughout this document) to offload traffic from the mobile networks is becoming more and more interesting from both the operator's and end user's points of view. Some of the reasons for this tendency are:

- Additional frequency: by using Wi-Fi, operators can access an additional 85 MHz of radio bandwidth in the 2.4 GHz band and another (close to) 500 MHz in the 5 GHz band.
- Cost: From the operator's point of view, Wi-Fi uses unlicensed frequency that is free of charge. On top of that, the cost of Wi-Fi Access Points (APs), both from capital expense (CAPEX) and operational expenses (OPEX) aspects, is often lower than that of a 3GPP base station (BS) (i.e. NodeB (NB) in case of UMTS or enhanced NodeB (eNB) in case of LTE. Operators can also take advantage of already deployed APs that are already deployed in hotspots such as train stations, airports, stadiums, shopping malls, etc. Most end users are also currently used to having Wi-Fi for free at home (as home broadband subscriptions are usually flat rate) and public places.
- Terminal support: Many User Equipments (UEs), including virtually all smartphones, and other portable devices currently available in the market, support Wi-Fi. In the Wi-Fi world, the term Station (STA) is used instead of UE, and as such the terms UE, STA and terminal are used interchangeably in this document.
- High data rate: Under low interference conditions and assuming the user device is close to the Wi-Fi AP, Wi-Fi can provide high data rates (for example, theoretically up to 600 Mbps for IEEE 802.11n deployments with MIMO (Multiple Input Multiple Output)).

For a wireless operator, offering a mix of two technologies that have been standardized in isolation from each other raises the challenge of providing intelligent mechanisms for co-existence. One area that needs these intelligent mechanisms is connection management.

Many of today's portable wireless devices (referred to hereinafter as "user equipments" or "UEs") support Wi-Fi in addition to one or several 3GPP cellular technologies. In many cases, however, these terminals essentially behave as two separate devices, from a radio access perspective. The 3GPP radio access network and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

A further level of integration can be realized via access selection that is based on radio access network (RAN) information on both the 3GPP RAN and Wi-Fi, in addition to common authentication and user plane integration methods.

There is ongoing work in the 3GPP RAN2 working group to further enhance the 3GPP RAN and Wi-Fi interworking on the 3GPP RRC-protocol layer. This means that new UE functionality will be available. The techniques detailed below are related to such new UEs.

Possible Methods to Support Traffic Steering from 3GPP to WLAN

Two alternatives for performing traffic steering between two radio access technologies (RATs), such as a 3GPP RAT and Wi-Fi, are described here. A first alternative is based on conditions and thresholds provided to the terminal by a first RAT (e.g. a network operating according to a first RAT, such as a 3GPP-specified RAT or WLAN). The conditions and thresholds dictate the situations in which the terminal should steer traffic from/to a second RAT (e.g. a network operating according to a second RAT, such as another 3GPP-specified RAT or WLAN). This alternative may be applied whether or not a connection exists between the terminal and the first RAT, e.g., both when a terminal is in RRC_CONNECTED mode in 3GPP LTE and when the terminal is in IDLE mode in LTE.

In a second alternative, a first RAT, e.g. a 3GPP RAT (a network operating according to a 3GPP RAT), controls a terminal's connection to a second RAT, e.g., a WLAN, by sending traffic steering commands that order the terminal to steer traffic from/to the second RAT. To send the traffic steering command it is required that a connection is established between the terminal and the network operating according to the first RAT, e.g., for a terminal to be in RRC_CONNECTED mode in 3GPP LTE if LTE should be sending traffic steering commands.

Note that it is possible that both alternatives are used, e.g., where the first alternative is used when no connection exists between the UE and controlling RAT and the second alternative is used when a connection exists.

Threshold based approach—In this alternative for performing traffic steering between 3GPP and WLAN, the 3GPP network provides the UE with conditions and thresholds which dictate the situations in which the terminal should steer traffic from one network (i.e. the 3GPP RAT) to the other (i.e. WLAN). For example, the set of conditions and thresholds could be something like:

If the RSRP (Reference Signal Received Power) of the current serving 3GPP cell is below threshold_RSRP, and there exists a WLAN with a RSSI_WLAN>RSSI_threshold (with RSSI being a received signal strength indication) and this WLAN is advertising a load level below WLAN_load_threshold, then offload traffic to WLAN (or, for the case when the UE was in IDLE mode, use WLAN when sending first uplink, UL, data).

Traffic steering command based approach—An alternative procedure for performing traffic steering between 3GPP and WLAN networks is described below. In short, this procedure is based on three messages and some associated procedures that allow the 3GPP network to determine when a terminal should associate with a WLAN or, more generally, to a network operating according to a second (possibly different) radio access technology (RAT). The procedure is illustrated in FIG. 1. The first message, a reporting configuration message (message 1), is sent from the 3GPP network (3GPP radio access network (RAN) 10) to the terminal 12 and configures the terminal 12 with a set of criteria for enabling, detecting, or performing measurements over the second network (WLAN 14). The terminal 12 subsequently sends a terminal report, message 2, to the 3GPP network 10, when the criteria given in the first message (message 1) have been fulfilled. The third message (message 3), a traffic steering message, is an indicator sent from the 3GPP network 10 to the terminal 12 that the terminal 12 should steer all or a subset of its traffic to WLAN 14.

Message 1—Reporting configuration message: The content of this message is a set of criteria. The criteria could be that certain parameters should exceed or fall below a given threshold. Parameters which could be considered include 3GPP received signal strength, WLAN received signal strength, 3GPP received signal quality, WLAN received signal quality, 3GPP related load, WLAN related load, etc.

One possible set of criteria contained in one possible reporting configuration message is as follows:

Received signal strength larger than threshold x
Received signal quality larger than threshold y
WLAN load less than threshold z When the terminal 12 has received reporting configuration message it should monitor the parameters associated with the criteria indicated in reporting configuration message. In case the criteria are fulfilled the terminal 12 should send a terminal report (message 2) to the 3GPP network 10.

Message 2—Terminal report: The terminal report is a message sent from the terminal 12 to the 3GPP network 10 reporting the fulfilment of the conditions given in reporting configuration message (message 1). The content of the report may include more information, such as all or part of the measurements done in the terminal 12 of the WLAN APs 14, and/or other information available in the terminal 12 from the WLAN 14, such as the WLAN load, etc. The arrow in FIG. 1 from the WLAN 14 to the UE 12 indicates the transmission of BSS/WAN metrics, such as WLAN load, from the WLAN 14 to the UE 12. In addition to metrics such as the WLAN load, the UE 12 can include additional information about the WLAN 14 in the terminal report that has not been signalled by the WLAN 14 to the UE 12. For example, the UE 12 may also include measurements of WLAN signals in the terminal report.

A time-to-trigger value can be specified to indicate to the UE (terminal 12) for how long the criteria should be fulfilled before the UE (terminal 12) reports back with the terminal report (message 2). In addition to that, the UE (terminal 12) can be configured with some filtering/smoothing parameters that it can use when collecting measurements to ensure that decisions will not be made based on instantaneous values. For example, the UE (terminal 12) can be configured with a moving average filter over a given duration, and the filtered value will be the one that will be compared with the threshold specified in the reporting configuration message (message 1). The parameters for filtering could be included in the reporting configuration message (message 1) and applicable only to the associated criteria, or they can be generic and communicated to the UEs (terminal 12) beforehand (either in a dedicated or broadcasted manner) and applicable to all reporting configuration messages thereafter.

In the event that there is a need for the 3GPP network 10 to identify a specific WLAN 14 network and associated measurements, WLAN identifiers (such as service set identification (SSID), basic SSID (BSSID)) may be included in the terminal report along with the relevant measurements (e.g. for SSID X the signal strength is A, for SSID Y the signal strength is B). This information may be necessary if the 3GPP network 10 wants to move a terminal 12 to a specific WLAN network 14/AP/etc.

SSID = operatorX-WLAN7
Received signal strength = −73 dBm
Received signal quality = 4.2 dB
WLAN load = 47%
SSID = operatorX-WLAN2
Received signal strength = −82 dBm
Received signal quality = 2.5 dB
WLAN load = 47%
SSID = operatorX-WLAN5
Received signal strength = −96 dBm
Received signal quality = 1.4 dB
WLAN load = 49%

The 3GPP RAN 10 will evaluate the reported results from the UE (terminal 12), considering also any other reports and information the network 10 may have available, such as backhaul congestion, delay, subscription information and interference, and determines whether or not to steer the UE's traffic to WLAN 14.

Message 3—Traffic steering message: The traffic steering message (message 3) is sent from the 3GPP network 10 to the terminal 12 and is used by the network 10 to indicate to the terminal 12 that some, or all, of the terminal's traffic should be steered to WLAN 14. The re-direction may contain a specific target, such as a prioritized AP/WLAN network 14, or it could be just a command telling the UE (terminal 12) to steer its traffic to WLAN 14 and the UE (terminal 12) and WLAN 14 will decide to which particular AP the UE (terminal 12) would use.

The network 10 will decide whether all or some of the terminal's bearers will be moved to one of the WLAN access points 14. In addition to the received information from the terminal 12, the 3GPP network 10 will also take into account other information available in the whole network (also from other network nodes), such as information determining radio interface load, load in backhaul, which radio capabilities are used, which radio capabilities could be used to enhance quality of service, QoS, etc. The 3GPP network 10 may also collect relevant information from other WLAN access points 14. All relevant information can be used to determine whether a move (of the traffic/bearers) should take place. The 3GPP network 10 may also request information from the possible target WLAN AP 14 over an interface between the 3GPP network 10 and WLAN nodes 14 (not shown in FIG. 1) about its possibilities to serve the potential traffic.

SUMMARY

According to the procedures discussed above for access network selection and traffic steering between 3GPP networks and WLANs, when a 3GPP RAN wants to steer a UE's traffic to WLAN, it can provide a set of conditions and thresholds that the UE should monitor before communicating back to the 3GPP RAN that the conditions have been fulfilled or before directly offloading its traffic. The usual approach in 3GPP is that the current network (i.e. the network operating according to the 3GPP RAT) broadcasts the conditions that need to be fulfilled in order for the UE to handover to another network (i.e. a network operating according to another RAT, e.g. WLAN). However, there is currently no mechanism for the WLAN to inform the UEs about the set of conditions that need to be fulfilled in order for it to offload to a 3GPP RAT.

Detailed herein are several techniques for addressing this problem. According to several of these techniques, two sets of thresholds and conditions are communicated to a UE from a first network operating according to a first RAT, either in a broadcast or dedicated fashion. One set is used for steering the UE's traffic from the first network operating according to the first RAT to a second network operating according to a second RAT, while the other set is used to control steering from the second network operating according to the second RAT to the first network operating according to the first RAT. Upon the fulfilment of these conditions, the UE either steers traffic to the network operating according to the target RAT or sends a measurement report to the first network operating according to the first RAT, which can then decide and send a command whether the UE should steer the traffic to the network operating according to the target RAT or keep using the network operating according to the source RAT.

Example aspects and embodiments of some of the techniques disclosed herein are described below. However, it should be understood that the list of example aspects and embodiments is not intended to be an exhaustive representation of the aspects and embodiments disclosed herein.

According to a first specific aspect there is provided a method in a node in a first radio access network (RAN), the method comprising sending a first set of thresholds and/or conditions to a UE, the first set of thresholds and/or conditions defining situations in which (a) the UE should send a measurement report to the first RAN with respect to a wireless local-area network (WLAN) or (b) the UE should initiate a steering of at least some traffic to the WLAN; and sending a second set of thresholds and/or conditions to the UE, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the method further comprises subsequently receiving a measurement report from the UE, with respect to the WLAN; and sending a traffic steering command to the UE, the traffic steering command directing the UE to steer at least some traffic to the WLAN.

In some embodiments the second set of thresholds and/or conditions comprises one or more offsets to be applied to the first set of thresholds and/or conditions to determine the situations in which, when the UE is subsequently connected to the WLAN, the UE should send a measurement report to the first RAN or the UE should initiate a steering of at least some traffic to the first RAN.

In some embodiments the first set of thresholds and/or conditions relates to at least one parameter that is not addressed in the second set of thresholds and/or conditions, and/or vice-versa.

In some embodiments at least the second set of thresholds and/or conditions is sent to the UE as part of a modified RRC Connection release message.

In some embodiments the second set of thresholds and/or conditions include or are associated with an expiry time, the expiry time indicating a time after which an alternate set of thresholds and/or conditions should be used.

In some embodiments the method further comprises the step of scaling the thresholds and/or conditions sent in the first set and/or second set depending on the network conditions in the first RAN.

According to a second specific aspect, there is provided a method in a terminal served by a first radio access network (RAN), the method comprising receiving a first set of thresholds and/or conditions from the first RAN, the first set of thresholds and/or conditions defining situations in which (a) the UE should send a measurement report to the first RAN with respect to a wireless local-area network (WLAN) or (b) the UE should initiate a steering of at least some traffic to the WLAN; and receiving a second set of thresholds and/or conditions from the first RAN, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the method further comprises subsequently determining that the first set of thresholds and/or conditions are met and sending a measurement report to the first RAN, with respect to the WLAN; and receiving a traffic steering command from the first RAN, the traffic steering command directing the UE to steer at least some traffic to the WLAN.

In some embodiments the method further comprises subsequently determining that the first set of thresholds and/or conditions are met; and autonomously initiating the steering of at least some traffic to the WLAN.

In some embodiments the method further comprises subsequently determining that the second set of thresholds and/or conditions are met and sending a measurement report to the first RAN; and receiving a traffic steering command from the first RAN, the traffic steering command directing the UE to steer at least some traffic to the first RAN.

In some embodiments the method further comprises subsequently determining that the second set of thresholds and/or conditions are met; and autonomously initiating the steering of at least some traffic to the first RAN.

In some embodiments the second set of thresholds and/or conditions comprises one or more offsets to be applied to the first set of thresholds and/or conditions to determine the situations in in which, when the UE is subsequently connected to the WLAN, the UE should send a measurement report to the first RAN or the UE should initiate a steering of at least some traffic to the first RAN.

In some embodiments the first set of thresholds and/or conditions relates to at least one parameter that is not addressed in the second set of thresholds and/or conditions, and/or vice-versa.

In some embodiments at least the second set of thresholds and/or conditions is received by the UE as part of a modified RRC Connection release message.

In some embodiments the second set of thresholds and/or conditions include or are associated with an expiry time, the expiry time indicating a time after which an alternate set of thresholds and/or conditions should be used.

In some embodiments the second set of thresholds and/or conditions are used until the UE performs cell reselection, after which an alternate set of thresholds and/or conditions should be used.

In some embodiments the second set of thresholds and/or conditions are used by the UE when the UE is in a connected mode and an idle mode with respect to the first RAN.

According to a third specific aspect, there is provided a node for use in a first radio access network (RAN), the node comprising means for sending a first set of thresholds and/or conditions to a UE, the first set of thresholds and/or conditions defining situations in which (a) the UE should send a measurement report to the first RAN with respect to a wireless local-area network (WLAN) or (b) the UE should initiate a steering of at least some traffic to the WLAN; and means for sending a second set of thresholds and/or conditions to the UE, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the node further comprises means for subsequently receiving a measurement report from the UE, with respect to the WLAN; and means for sending a traffic steering command to the UE, the traffic steering command directing the UE to steer at least some traffic to the WLAN.

In some embodiments the node further comprises means for scaling the thresholds and/or conditions sent in the first set and/or second set depending on the network conditions in the first RAN.

According to a fourth specific aspect, there is provided a node for use in a first radio access network (RAN), the node comprising a processing circuit adapted to send a first set of thresholds and/or conditions to a UE, the first set of thresholds and/or conditions defining situations in which (a) the UE should send a measurement report to the first RAN with respect to a wireless local-area network (WLAN) or (b) the UE should initiate a steering of at least some traffic to the WLAN; and send a second set of thresholds and/or conditions to the UE, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the processing circuit is further configured to subsequently receive a measurement report from the UE, with respect to the WLAN; and send a traffic steering command to the UE, the traffic steering command directing the UE to steer at least some traffic to the WLAN.

In some embodiments the processing circuit is further configured to scale the thresholds and/or conditions sent in the first set and/or second set depending on the network conditions in the first RAN.

According to a fifth specific aspect, there is provided a user equipment, UE, comprising a radio transceiver adapted for communication with a first radio access network (RAN) and a wireless LAN, the UE further comprising means for receiving a first set of thresholds and/or conditions from the first RAN, the first set of thresholds and/or conditions defining situations in which (a) the UE should send a measurement report to the first RAN with respect to a wireless local-area network (WLAN) or (b) the UE should initiate a steering of at least some traffic to the WLAN; and means for receiving a second set of thresholds and/or conditions from the first RAN, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the UE further comprises means for subsequently determining that the first set of thresholds and/or conditions are met and means for sending a measurement report to the first RAN, with respect to the WLAN; and means for receiving a traffic steering command from the first RAN, the traffic steering command directing the UE to steer at least some traffic to the WLAN.

In some embodiments the UE further comprises means for subsequently determining that the first set of thresholds and/or conditions are met; and means for autonomously initiating the steering of at least some traffic to the WLAN.

In some embodiments the UE further comprises means for subsequently determining that the second set of thresholds and/or conditions are met and sending a measurement report to the first RAN; and means for receiving a traffic steering command from the first RAN, the traffic steering command directing the UE to steer at least some traffic to the first RAN.

In some embodiments the UE further comprises means for subsequently determining that the second set of thresholds and/or conditions are met; and means for autonomously initiating the steering of at least some traffic to the first RAN.

In some embodiments the second set of thresholds and/or conditions comprises one or more offsets to be applied to the first set of thresholds and/or conditions to determine the situations in in which, when the UE is subsequently connected to the WLAN, the UE should send a measurement report to the first RAN or the UE should initiate a steering of at least some traffic to the first RAN.

According to a sixth specific aspect, there is provided a user equipment (UE) comprising a radio transceiver adapted for communication with a first radio access network (RAN) and a processing circuit adapted to receive a first set of thresholds and/or conditions from the first RAN, the first set of thresholds and/or conditions defining situations in which (a) the UE should send a measurement report to the first RAN with respect to a wireless local-area network (WLAN) or (b) the UE should initiate a steering of at least some traffic to the WLAN; and receive a second set of thresholds and/or conditions from the first RAN, the second set of thresholds and/or conditions defining situations in which, when the UE is subsequently connected to the WLAN, (c) the UE should send a measurement report to the first RAN or (d) the UE should initiate a steering of at least some traffic to the first RAN.

In some embodiments the first RAN is a 3GPP RAN (e.g., LTE, WCDMA, HSPA or GSM).

In some embodiments the processing circuit is further adapted to subsequently determine that the first set of thresholds and/or conditions are met and send a measurement report to the first RAN, with respect to the WLAN; and receive a traffic steering command from the first RAN, the traffic steering command directing the UE to steer at least some traffic to the WLAN.

In some embodiments the processing circuit is further adapted to subsequently determine that the first set of thresholds and/or conditions are met; and autonomously initiate the steering of at least some traffic to the WLAN.

In some embodiments the processing circuit is further adapted to subsequently determine that the second set of thresholds and/or conditions are met and send a measurement report to the first RAN; and receive a traffic steering command from the first RAN, the traffic steering command directing the UE to steer at least some traffic to the first RAN.

In some embodiments the UE further comprises the processing circuit is further adapted to subsequently determine that the second set of thresholds and/or conditions are met; and autonomously initiate the steering of at least some traffic to the first RAN.

In some embodiments the second set of thresholds and/or conditions comprises one or more offsets to be applied to the first set of thresholds and/or conditions to determine the situations in in which, when the UE is subsequently connected to the WLAN, the UE should send a measurement report to the first RAN or the UE should initiate a steering of at least some traffic to the first RAN.

In some embodiments the first set of thresholds and/or conditions relates to at least one parameter that is not addressed in the second set of thresholds and/or conditions, and/or vice-versa.

In some embodiments the processing circuit is adapted to receive at least the second set of thresholds and/or conditions as part of a RRC Connection release message.

In some embodiments the second set of thresholds and/or conditions include or are associated with an expiry time, and the processing circuit is adapted to use the second set of thresholds and/or conditions until expiry of the expiry time and to use an alternate set of thresholds and/or conditions after expiry of the expiry time.

In some embodiments the processing circuit is adapted to use the second set of thresholds and/or conditions until the UE performs cell reselection, after which the processing circuit is adapted to use an alternate set of thresholds and/or conditions.

In some embodiments the processing circuit is adapted to use the second set of thresholds and/or conditions when the UE is in a connected mode and an idle mode with respect to the first RAN.

BRIEF DESCRIPTION OF THE DRAWINGS

Exemplary embodiments of the techniques introduced in this document are described below with reference to the following figures, in which.

DETAILED DESCRIPTION

Figure 1:
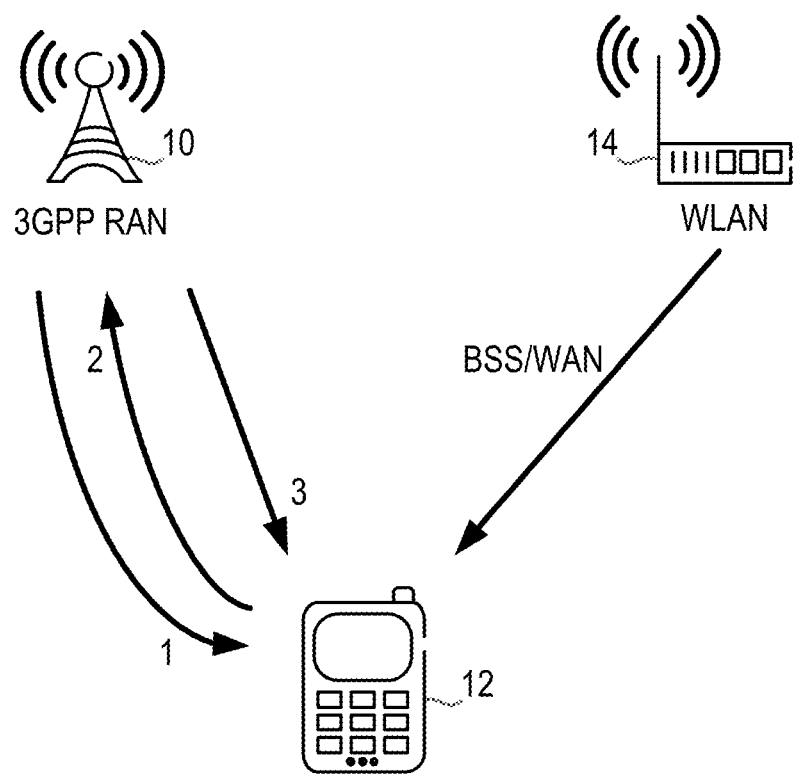
FIG. 1 is a signalling diagram illustrating a technique for network controlled access selection and traffic steering.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "UEs", which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems (and that are also referred to as "terminals" herein). It should also be noted that the current disclosure relates to end user wireless devices that support, for example, both a wireless local area network (WLAN) technology, such as one or more of the IEEE 802.11 standards, and one or more wide-area cellular technologies, such as any of the wide-area radio access standards maintained by 3GPP and/or for example more than one radio access technology (RAT), for example two or more wide-area cellular technologies, such as any of the wide-area radio access standards maintained by 3GPP. End user devices are referred to in Wi-Fi document as "stations," or "STA"—it should be appreciated that the term "UE" or "terminal" as used herein should be understood to refer to a STA, and vice-versa, unless the context clearly indicates otherwise.

Figure 2:
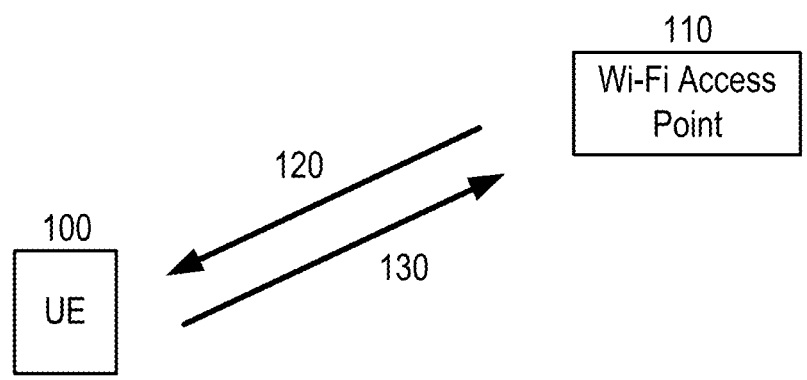
FIG. 2 illustrates an exemplary wireless terminal that is able to communicate with a Wi-Fi access point.

FIG. 2 illustrates a wireless terminal UE 100 able to communicate, using 802.11-specified protocols, with a Wi-Fi access point 110. Downlink communication 120 is directed from the Wi-Fi access point 110 to the UE 100, while uplink communication 130 is directed from the UE 100 to the Wi-Fi access point 110. Note that while the detailed embodiments discussed herein are described in reference to the IEEE 802.11 standards commonly referred to as "Wi-Fi," the techniques and apparatus described are not necessarily limited to those standards, but may be applied more generally to other wireless local area network (WLAN) technologies.

For the UE to find an access point to connect to, a beacon signal is transmitted from the Wi-Fi access point. This beacon signal indicates details about the access point and provides the UE with enough information to be able to send a request for access. Accessing a Wi-Fi access point includes an information exchange between UE 100 and Wi-Fi Access point 110, including, for example, probe requests and responses, and authentication requests and response. The exact content of these sequences are omitted for clarity.

Figure 3:
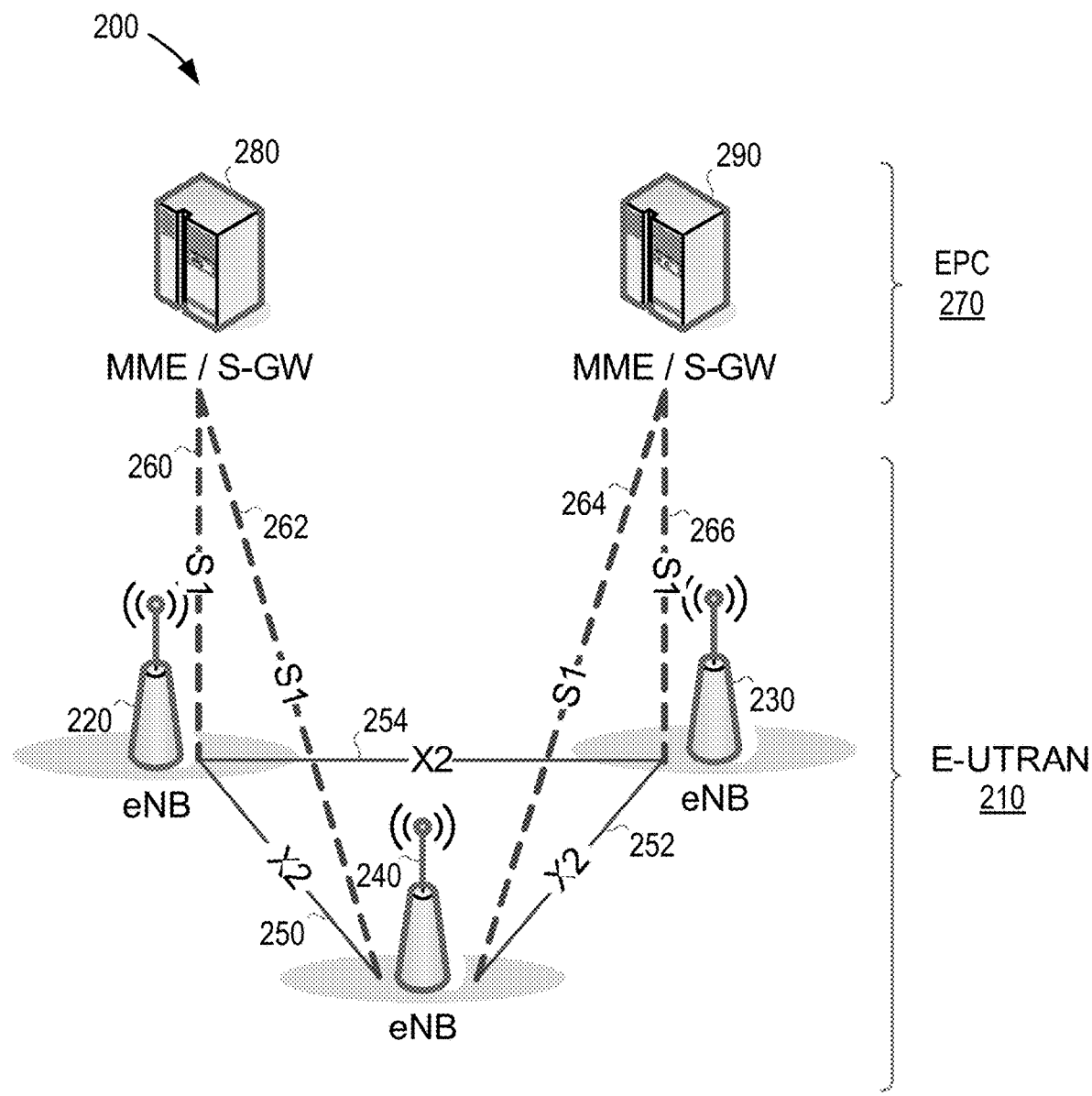
FIG. 3 illustrates a portion of the a radio access network and controller nodes.

FIG. 3 illustrates a portion of the LTE radio access network and controller nodes. The LTE network 200 is more formally known as the Evolved UMTS Terrestrial Radio Access Network (E-UTRAN) 210 and includes base stations 220, 230, 240, called enhanced NodeBs (eNBs or eNodeBs), which provide the E-UTRA (Evolved UMTS Terrestrial Radio Access) user plane and control plane protocol terminations towards the User Equipment (UE). It should be noted that even though LTE is used as an example of a radio access technology (RAT) herein, the procedures described herein can be applied to other wide-area RATs, including (but not limited to) other 3GPP RATs.

Referring again to FIG. 3, the eNBs 210, 220, 230 are interconnected with each other by means of the X2 interface 250, 252, 254. The eNBs are also connected by means of the S1 interface 260, 262, 264, 266 to the Evolved Packet Core (EPC) 270, and more specifically to Mobility Management Entities (MMEs) 280, 290, by means of the S1-MME interface, and to the Serving Gateway (S-GW) 280, 290 by means of the S1-U interface. The S1 interface supports many-to-many relation between MMEs/S-GWs and eNBs.

The eNB hosts functionalities such as Radio Resource Management (RRM), radio bearer control, admission control, header compression of user plane data towards serving gateway, and routing of user plane data towards the serving gateway. The MME 280, 290 is the control node that processes the signalling between the UE and the core network 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink (DL) data buffering while the UE is being paged, packet routing and forwarding the right eNB, gathering of information for charging and lawful interception. A packet data network (PDN) Gateway (P-GW), not shown in FIG. 3, is the node responsible for UE Internet Protocol (IP) address allocation, as well as for Quality-of-Service (QoS) enforcement.

Figure 4:
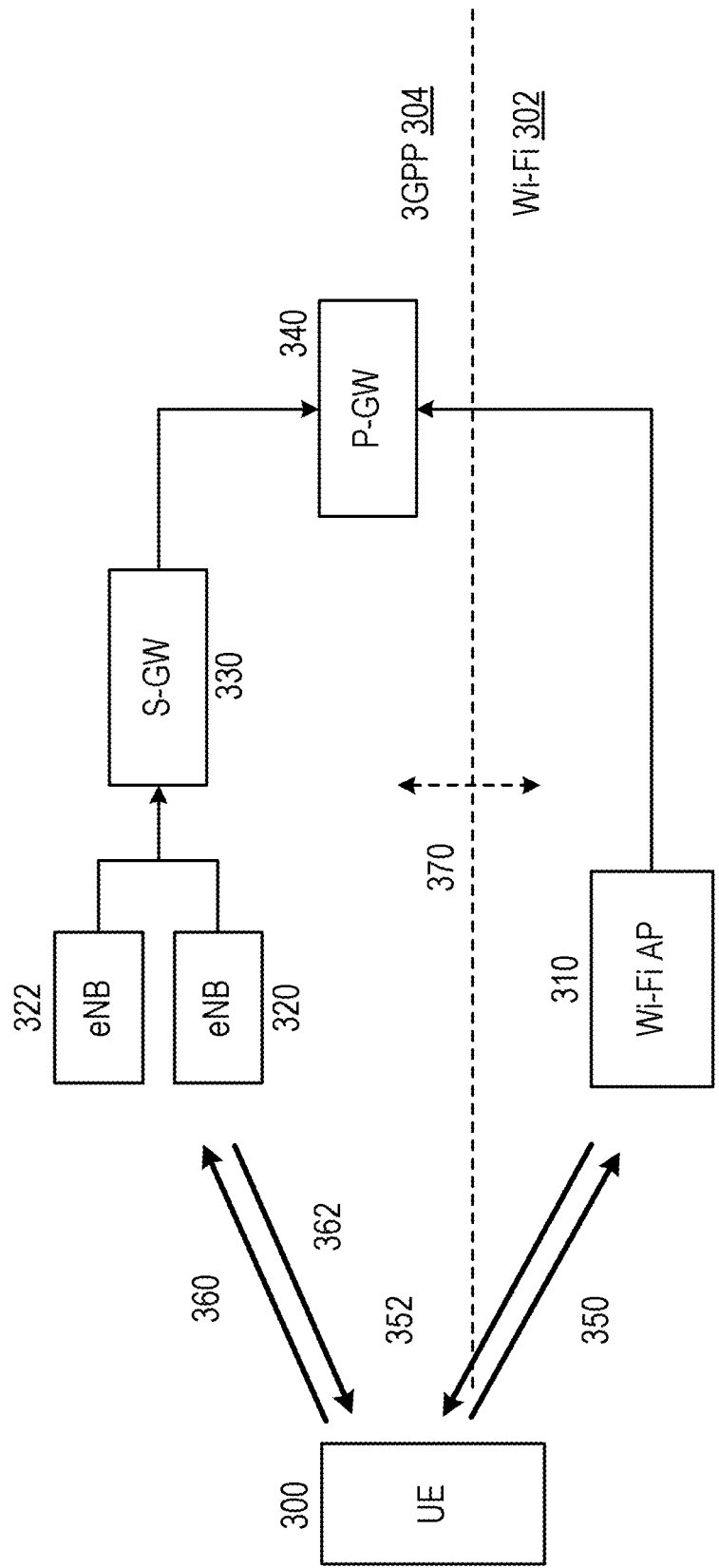
FIG. 4 illustrates a network where LTE radio access parts and a Wi-Fi wireless access point are both connected to the same P-GW.

FIG. 4 illustrates a network where the LTE radio access parts (eNBs) 320, 322 and a Wi-Fi wireless access point 310 are both connected to the same P-GW 340. In the case of the LTE radio access parts, the eNBs 320, 322 are connected to the P-GW 340 via an S-GW 330. A UE 300 is shown that is capable of being served both from the Wi-Fi Access Point 310 and the LTE eNBs 320, 322. Arrows 350 and 352 illustrate the blink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 4 illustrates one possible way of connecting a Wi-Fi access network 302 to the same core network as the 3GPP-specified access network 304. It should be noted that the presently disclosed techniques are not restricted to scenarios where the Wi-Fi access network 302 is connected in this way; scenarios where the networks are more separate, e.g., as illustrated in FIGS. 2 and 3, are also possible scenarios.

There can be an interface 370 between the Wi-Fi and 3GPP domains, whereby the two networks can exchange information that can be used to facilitate on steering traffic over the right network. One example of such information exchanged via the interface 370 is load conditions in the two networks. The two networks can also exchange information with regard to the context of the UE 300, so that each can be aware of whether the UE is being served by the other network, as well as some details of the connection over the other network (e.g. traffic volume, throughput, etc. . . . )

It should be noted that an access-point controller (AC) functionality may also exist in the Wi-Fi domain 302 that controls the Wi-Fi AP 310. This functionality, though not depicted in the figure for the sake of clarity, can be physically located in 310, 340 or another separate physical entity.

Figure 5:
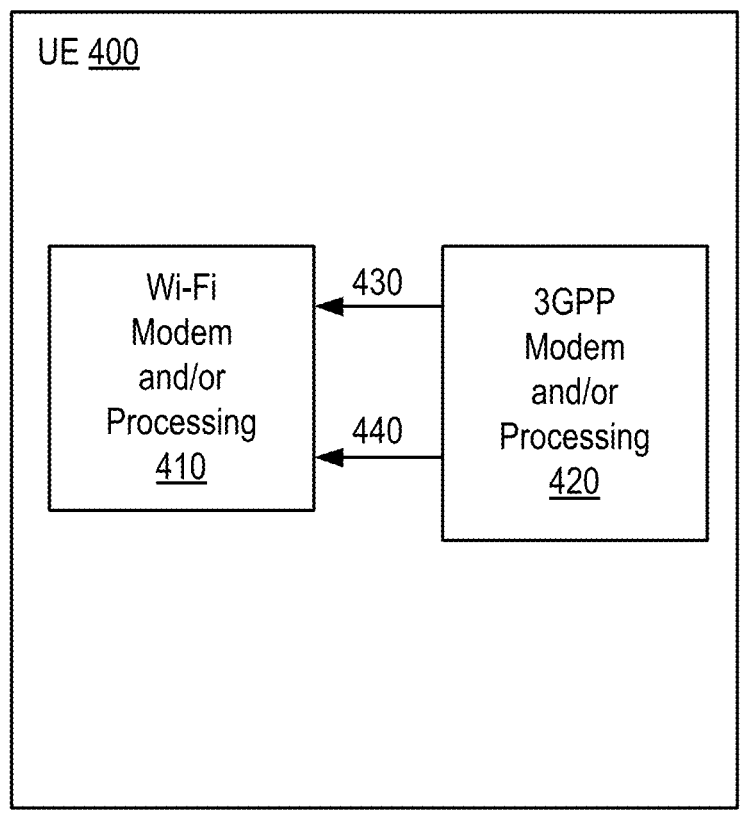
FIG. 5 illustrates a UE capable of communicating both over a 3GPP-specified access technology and also over an 802.11 Wi-Fi specified access technology.

FIG. 5 illustrates a UE 400 capable of communicating both over a 3GPP-specified access technology and also over an 802.11 Wi-Fi specified access technology. For illustrative purposes, the processing and modem related to the Wi-Fi parts 410 are separated from the processing and modem related to the 3GPP parts 420. It will be appreciated that the implementation of these portions could be integrated on the same hardware unit, or can be carried out using physically distinct hardware and/or hardware-software combinations.

As noted above, many smartphones on the market today support Wi-Fi connectivity in addition to supporting one or more cellular radio-access technologies (RATs), such as the several RATs standardized by 3GPP. With many of these smartphones, the Wi-Fi connection manager, which handles communications to and from Wi-Fi access points, immediately tries to attach to a Wi-Fi access point (AP) as soon as the device is within the coverage area of the AP, provided that the SSID of the Wi-Fi AP is identified/pre-defined and credentials are provided (usually manually). To be able to do this, the device performs Wi-Fi scanning, i.e., searching for Wi-Fi access points to connect to, on a more-or-less continuous basis. This continuous scanning drains battery power from the UE, shortening the time between re-charges.

In an operator controlled Wi-Fi scenario, a UE may usually be served with communication through the cellular 3GPP network. Occasionally, e.g., when moving indoors, or when cellular performance deteriorates and there is good Wi-Fi coverage, it would be advantageous, from a network-performance perspective or a user-experience perspective, or both, for the UE to receive services through Wi-Fi instead of through the 3GPP radio access network. In scenarios where a UE is currently being served by a 3GPP network, it is not necessary for a UE to continuously scan for Wi-Fi access points whenever Wi-Fi operation is enabled. Likewise, when the UE is connected to a Wi-Fi access point, it need not necessarily search out other connection means on a continuous basis.

To address these problems, mechanisms have been provided for overcoming the shortcoming of having UEs that are capable of providing service through both a 3GPP-specified radio access technology and a Wi-Fi wireless access technology, in situations when the UE is connected to one, from continuously scan for access opportunities of the other.

One such mechanism is the mobility procedure described above and illustrated in FIG. 1. In this mechanism, to enable a 3GPP Radio Access Network (RAN) 10 to be in control of a terminal's WLAN connection, dedicated traffic steering commands (message 3) or policies can be sent from the 3GPP RAN 10 to the terminal 12. For example, the 3GPP RAN 10 can send a message 3 (with a traffic steering command or policy) to the terminal 12, ordering it to route (switch) its traffic from the 3GPP RAN 10 to a WLAN 14, or ordering it to route (switch) the traffic from WLAN 14 to the 3GPP network 10.

Another mechanism is the threshold-based approach described briefly above, where conditions and/or thresholds provided to the UE (terminal) by the 3GPP network dictate situations in which the terminal should steer traffic from one network to the other.

With either of these mechanisms, the usual approach in 3GPP is that the current RAT (i.e. the access network serving/controlling the UE) broadcasts the thresholds and/or conditions that need to be fulfilled in order for the UE to handover to a network operating according to another RAT. However, there is currently no mechanism for the WLAN RAT to inform the UEs about the set of thresholds and/or conditions that need to be fulfilled in order for it to offload to a 3GPP RAT.

Described below are several techniques for addressing this problem. According to several of these techniques, two sets of thresholds and conditions are communicated to a UE from a network operating according to a first RAT, either in a broadcast or dedicated fashion. One set is used for steering the UE's traffic from the network operating according to the first RAT to a network operating according to a second (possibly different) RAT, while the other set is used to control steering from the network operating according to the second RAT to the network operating according to the first RAT. Upon the fulfilment of these thresholds and/or conditions, the UE either steers traffic to the target RAT or sends a measurement report to the network operating according to the first RAT, which can then decide and send a command whether the UE should steer the traffic to the network operating according to the target RAT or keep using the source RAT (i.e. the network operating according to the RAT the UE is currently sending its traffic to).

For the sake of simplicity, the list below introduces some terms which will be used throughout this document:

Active state—A state of the terminal in which dedicated signalling between the terminal and the wide-area RAN (e.g., the 3GPP RAN) is possible. Examples of such states are: CELL_FACH and CELL_DCH in UMTS, and RRC_CONNECTED in LTE (with RRC representing Radio Resource Control).

Inactive state—A state of the terminal in which dedicated signalling between the terminal and the wide-area RAN (e.g., the 3GPP RAN) is not possible. Examples of such states are: URA_PCH, CELL_PCH and IDLE in UMTS, and IDLE in LTE.

At various points in this document it may be mentioned that a terminal is "connected" to WLAN. It should be appreciated that being connected to WLAN can mean any of several different things, as exemplified by the existence of one or more of the below conditions:

802.11 authentication (Authentication to the WLAN AP) has been completed or is under way;

802.1x extensible authentication protocol for subscriber identity module EAP-SIM authentication (Authentication to the authentication, authorisation and accounting (AAA)-servers has been completed or is under way;

Four way hand-shake between the terminal and the WLAN network has been completed;

An IP address has been assigned to the terminal in WLAN;

a packet data network (PDN) connection has been established through the WLAN network, i.e., a connection between the terminal and the PDN gateway;

Data traffic has been started through the WLAN network.

Examples of messages indicating to the UE that it should be moved to an inactive state are:

RRCConnectionRelease. As specified in section 5.3.8 of 3GPP TS 36.331 v11.1.10;

Radio Bearer Reconfiguration. As specified in section 8.2 in 3GPP TS 25.331, v. 11.5.0.

In the following description of the various solutions provided by the present disclosure, the arrangement shown in FIG. 4 is used as a basis for the explanation, and references in the description below to a terminal/UE, eNB, 3GPP network/RAN, Wi-Fi AP and WLAN are to the UE 300, eNB 320, 3GPP network/RAN 304, Wi-Fi AP 310 and WLAN 302 shown in FIG. 4. However, it will be appreciated that the various solutions provided by the present disclosure are not limited to implementation in the arrangement shown in FIG. 4.

It will be appreciated by those skilled in the art that, unless the context clearly indicates otherwise, references in the explanation below to "3GPP RAT", "WLAN RAT" and "Wi-Fi RAT" are to access networks (e.g. RANs) operating according to those radio access technologies (with "first RAT" and "second RAT" being interpreted in a similar way). In a similar manner, it will be understood by those skilled in the art that references in the explanation below to operations being performed by a RAT (e.g. the transmission of thresholds and/or conditions, the transmission of traffic steering commands, the steering of traffic to the RAT, etc.) are to those operations being performed by a network operating according to the RAT.

Traffic Steering from a WLAN to a Wide-Area RAN

In this document, techniques to allow a 3GPP RAT 304 to control a terminal's connection to WLAN 302 are discussed. However, it should be noted that this is just one example made for illustrative purposes only and the procedures described herein can be applied to also other combinations of RATs, such as a WLAN network 302 controlling a terminal connection to a 3GPP RAT 304, a WiMAX network controlling a terminal connection to Bluetooth, etc. It should also be noted that the terms UE, terminal, STA are different terms used for wireless mobile devices and may be used interchangeably throughout this document. In the rest of the document traffic steering from 3GPP 304 to WLAN 302 is referred to as forward traffic steering or forward handover and WLAN 302 to 3GPP 304 steering as backward traffic steering or backward handover.

The techniques detailed herein apply to both threshold-based steering and traffic steering command-based offloading mechanisms, as described earlier. In the event that a threshold-based traffic steering mechanism like the one described above is used and the conditions in the two networks are such that WLAN 302 is the preferred network for the concerned UE 300 (e.g., RSRP for the UE 300 is below a certain level and the UE 300 is within the coverage area of an unloaded WLAN 302 with which it has a good RSSI with), when the UE 300 has a data to send on the UL (e.g., user clicks on a link to a streaming video), the offloading strategy of the threshold-based approach ensures that the UE 300 connects to the WLAN network 302. Similarly, the mechanisms of the steering command-based approach might be in effect when the conditions in the 3GPP RAT 304 degrade (e.g., RSRP for that UE 300 decreases or the 3GPP RAT 304 becomes overloaded). At the same time, the UE 300 might be within the coverage of a WLAN AP 304 and is receiving a good signal level (i.e., RSSI/received channel power indicator (RCPI)). With the command-based approach, the current 3GPP RAT 304 (i.e. the 3GPP RAT serving the UE) can inform the UE 300 to look for a certain set of conditions in order to evaluate whether it would be beneficial for the UE 300 to connect to WLAN 302 and route traffic there instead. Once those conditions have been met, the UE 300 will inform the 3GPP RAN 304 (e.g., via sending a measurement report), which will evaluate the provided information and possibly issue a traffic steering command, effectively steering some or all of the UE's traffic to WLAN 302.

At a later point of time, the conditions in the 3GPP RAN 304 can improve (e.g., better RSRP, low load in the 3GPP network 304, etc.) and/or at the same time the conditions in the WLAN 302 worsen (e.g., lower RSSI, WLAN 302 becomes overloaded, etc.). In such a case, it might be beneficial, both from the UE 300 and the system perspectives, to perform a backward traffic steering and bring some or all of the UE's traffic to 3GPP 304.

Currently, if the UE 300 needs to be steered between different 3GPP RATs 304 (i.e., execution of inter-system handover), the currently used RAT 304 informs the UE 300 about the set of conditions that need to be met. However, the current 3GPP principles for inter-system handover cannot be applied for the case when the UE 300 is connected to WLAN 302, because there is no existing mechanism that allows the WLAN 302 to inform the UE 300 about the condition set for backward traffic steering (i.e., from WLAN 302 to 3GPP 304). Hence, the following improvements to the 3GPP↔WLAN offloading procedures are proposed.

In one embodiment, the first RAT (e.g. a 3GPP RAT) communicates to the UE 300 two sets of conditions and/or thresholds for handling traffic steering between two RATs (e.g. the 3GPP RAT 304 and a WLAN 302). A first set of thresholds and/or conditions are used for a traffic steering process from a first RAT to a second RAT (and/or to determine whether the UE 300 should connect to the network operating according to the second RAT), while a second set of thresholds and/or conditions are used for a traffic steering process from the second RAT to the first RAT (and/or to determine whether the UE 300 should connect to the network operating according to the first RAT).

For instance, one set of conditions and/or thresholds, for example as in List 1 shown below, dictate the situations in which a terminal 300 should steer traffic from 3GPP 304 to WLAN 302 or connect to WLAN 302 (in the case of a threshold-based steering mechanism) or send a measurement report to a 3GPP RAT 304 (in the event that a command-based mechanism is used). Another set of conditions and/or thresholds, for example as in list 2 shown below, dictate the situations in which a terminal 300 should steer traffic (back) from WLAN 302 to a 3GPP RAT 304 or reconnect to the 3GPP network 304 or trigger the sending of a measurement report to a 3GPP RAT 304 (even in the case that there might be no traffic running over the 3GPP RAN 304).

It should be noted that the two sets may have conditions and thresholds on different and possibly non-overlapping parameters. For example the conditions and thresholds for forwards traffic steering might be based only on LTE RSRP, WLAN RSSI and WLAN air interface load, while the conditions and thresholds for backward traffic steering may also be based on WLAN backhaul load and buffer status for that particular UE 300. The benefit of having the possibility to have conditions and thresholds for different parameters is that some parameters may be more complicated to access, such as those provided by ANQP (Access Network Query Protocol), the query and response protocol used by Wi-Fi STAs to automatically discover available Wi-Fi hotspots.

List 1: Conditions and Thresholds for Measurement Reporting or Offloading from 3GPP to WLAN
    LTE RSRP<$X_1$ dBm
    WLAN RSSI>$Y_1$ dBm
    WLAN air interface load<$Z_1$%

List 2: Conditions and Thresholds for Measurement Reporting or Steering Traffic from WLAN to 3GPP
    LTE RSRP>$X_2$ dBm
    WLAN RSSI<$Y_2$ dBm
    WLAN air interface load>$Z_2$%
    WLAN backhaul load>Q In one possible implementation of this embodiment, the value of the LTE RSRP threshold $X_1$ is −100 dBm for steering traffic from 3GPP to WLAN, and the value of the LTE RSRP threshold $X_2$ is −90 dBm for steering traffic from WLAN to 3GPP.

So far, it has been assumed that besides the legacy set of thresholds and/or conditions required for the forward handover, there is a new set of conditions for the backward handover. A variant of this approach is to reuse the condition set for the forward handover and add a special backward handover offset. In that case, the UE 300 will only need to monitor one set of conditions (the forward set) and a backward handover offset. For example, the first set of conditions and thresholds (such as in List 3 shown below) dictate when the terminal 300 should perform traffic steering from LTE 304 to WLAN 302 and the second set of conditions and thresholds (such as in List 4 shown below) dictates when the terminal 300 should steer traffic (back) from WLAN 302 to 3GPP 304.

List 3: Conditions and Threshold Set S
    LTE RSRP<X dBm
    WLAN RSSI>Y dBm
    WLAN load<Z %

List 4: Offset of Conditions and Threshold Set S
    LTE RSRP>X+a dBm
    WLAN RSSI<Y+b dBm
    WLAN load>Z+c %

In one possible implementation of this embodiment, the value of the LTE RSRP threshold X is −100 dBm for steering traffic from 3GPP to WLAN, and the value of the offset "a" for the LTE RSRP threshold is +10 dBm for steering traffic from WLAN to 3GPP, resulting in a threshold of −90 dBm.

Note that there are three possibilities of using the threshold-based and command-based mechanisms described above for forward and backward traffic steering:
    Threshold-based approach for both forward and backward steering
    Traffic steering command-based approach for forward steering and threshold-based approach for backward steering
    Traffic steering command-based approach for both forward and backward steering.

A main difference between the threshold based approach and traffic steering command based approach is that in the first case, the fulfilment of the conditions leads to immediate steering, while in the second case it leads only to the sending of measurement report; the UE 300 in the second case has to wait for an explicit steering command from the network. Another difference is that for the threshold based approach, the conditions and thresholds can be communicated either in a broadcast or dedicated manner while for the traffic steering command based approach, it is assumed that the conditions and thresholds are communicated to the UE 300 in a dedicated manner (e.g., measurement configurations). One can envision a scenario where the thresholds and conditions are also broadcasted in the case of the traffic steering command based approach, but where UE 300 responds by sending measurement reports when the conditions are fulfilled rather than directly performing the traffic steering as in the case of the threshold based approach.

In the event that the traffic steering command-based approach is used, the 3GPP network 304 might want to keep the UE 300 in IDLE mode to save UE battery consumption or to minimize the network resources that are needed to keep the UE 300 in connected mode. In that case, the backward steering thresholds can be communicated by including them in a modified RRC Connection release message that is sent to the UE 300, for example. The backward steering thresholds might be communicated in another message sent in relation to the RRC Connection release message, in other embodiments. In either case, these thresholds may be referred to as "sticky thresholds" to signify that while the thresholds are communicated while the UE is in connected mode, they are still applicable when the UE is also in IDLE mode. Note that, as mentioned above, the 3GPP network 304 can send the "sticky thresholds" for steering from WLAN 302 back to 3GPP 304 also in message 1 of the traffic steering command-based approach.

However, the sticky thresholds might become obsolete for several reasons, such as network conditions changing considerably after the UE 300 has moved to IDLE mode or that the UE 300 might have moved to another 3GPP cell where the network conditions are completely different. One possibility to deal with this is that the sticky thresholds are associated with an expiry time (which can be sent separately or via the RRC connection release message), and which is measured from, for example, the time of reception of the sticky thresholds. After the expiry time, the UE 300 will start using the broadcasted thresholds instead. Another alternative is that the UE 300 keeps using the sticky thresholds unless it performs cell reselection, in which case, it tries to use any backward steering thresholds that are broadcasted in the new cell. Other possibilities are also applicable here.

As mentioned earlier, the backward offload thresholds are used either for triggering measurement reports or for directly initiating steering back to the 3GPP network 304. In case the UE 300 was in IDLE mode when the conditions for the thresholds are fulfilled, then this first requires the setting up of a connection with the 3GPP network 304. Several alternatives can be envisioned regarding the way the UE 300 proceeds during/after the RRC connection request. For example:
    the UE 300 sends an RRC connection request, followed by a scheduling request for measurement reporting, and sends the measurement report when the scheduling request is granted;
    the UE 300 sends a modified RRC connection request, which includes a flag indicating that the conditions for sending measurement reports are fulfilled, so that the eNB can allocate the scheduling grant for measurement reporting; or UE 300 sends a modified RRC connection request, which includes a flag indicating that the conditions for sending measurement reports are fulfilled, and the eNB 320 orders the UE 300 to steer its traffic back to 3GPP 304.

The thresholds for backward and forward offloading can be scaled up and down depending on the network conditions. If the 3GPP network 304 is being overloaded, it can relax the forward offloading conditions (e.g. decrease the RSSI threshold to trigger forward offloading or measurement reporting, i.e. decrease the RSSI threshold relative to a 'normal' threshold value to increase the likelihood of forward offloading or measurement reporting being triggered) and make the backward offloading conditions more demanding (e.g., increase the RSRP threshold to trigger backward offloading or measurement reporting, i.e. increase the RSRP threshold relative to a 'normal' threshold to reduce the likelihood of backward offloading or measurement reporting being triggered).

In some implementations, the WLAN 302 informs the UE 300 (either via broadcast or unicast signalling) about the conditions set for backward handover. An example of broadcast signalling enhancement would be altering the WLAN beacon frame to include the aforementioned condition set. Another example would be to introduce a new ANQP element that can carry that information to UEs that perform an ANQP request.

Figure 6:
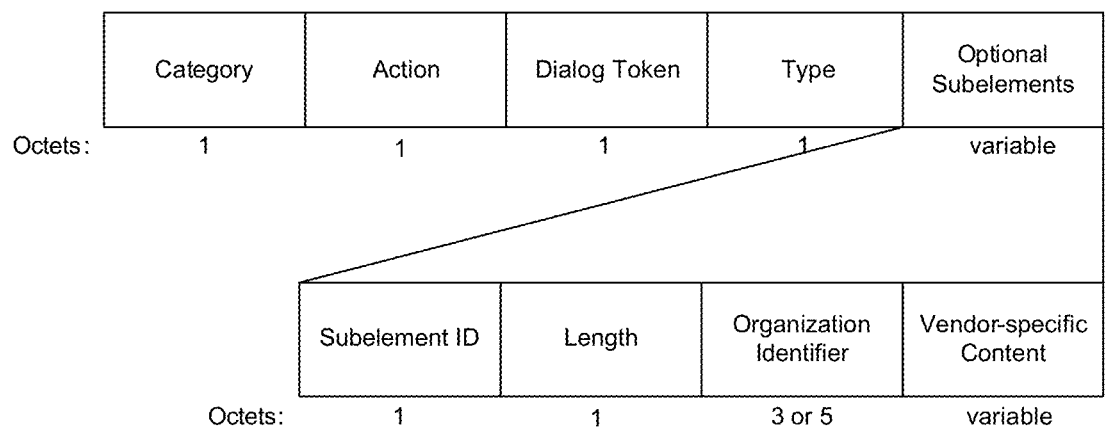
FIG. 6 shows an exemplary Wireless Network Management Notification Request frame.

Alternatively, a unicast signalling can be used. Again, a new ANQP element could be added, but this time instead of delivering the information to the UEs, the WLAN network 302 only selects particular ones (based on e.g. UE's identity, MAC address, IMEI, etc.). Another option for the unicast signalling is to add a new frame specifically designated for the purpose of communicating the condition set to the UE 300. One example of such a frame would be a Wireless Network Management (WNM) Notification Request frame, with a Vendor Specific content (shown on FIG. 6). This field has a variable length and can be formatted in such a way so it can communicate to the UE 300 the needed information.

In another embodiment, a network node having information about the two RATs, monitors both the 3GPP RANs 304 and the WLAN 302 that the UE 300 is within coverage range of. If this network node decides that it would be beneficial for the UE 300 to perform the backward handover, it communicates that to the 3GPP RAN 304 or the WLAN 302, which respectively informs the UE 300 of the condition set for the backward handover.

For the sake of brevity, this description has mostly discussed the case where the UE 300 is using only one RAT for all its traffic in the above discussions. However, the techniques described above are equally applicable to the cases for partial steering, where some traffic is being routed via one RAT and the rest via another RAT (or even the case of more than two RATs being used at the same time).

Figure 7:
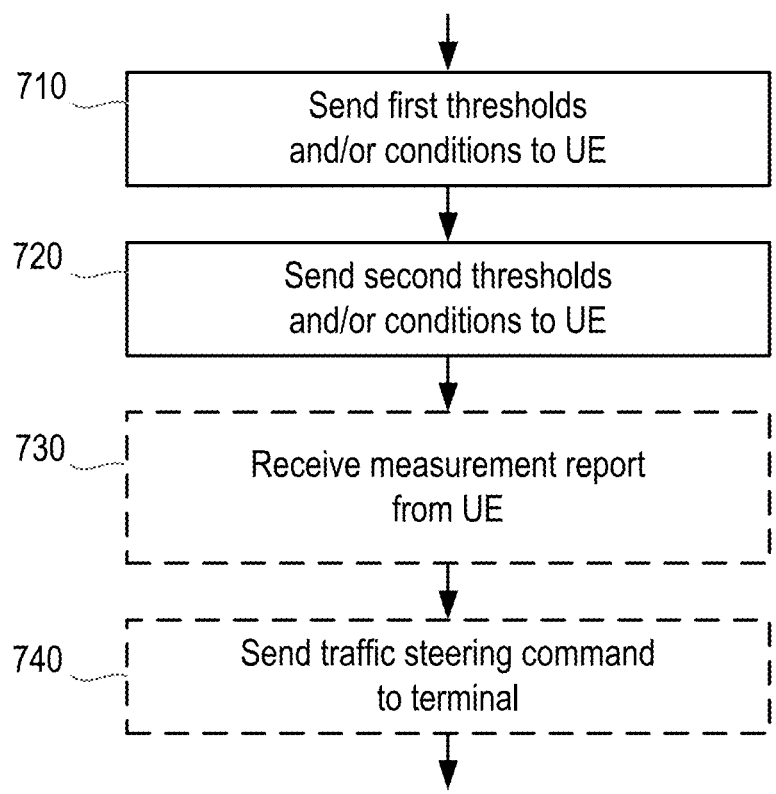
FIG. 7 is a flow chart illustrating a method in a network node according to an embodiment.

FIG. 7 is a process flow diagram illustrating an example process according to some of the techniques described above, as implemented in a network node in a first access network operating according to a first RAT (e.g. an eNodeB 320). As shown at block 710, the illustrated method begins with the sending of a first set of thresholds and/or conditions to a UE 300, the first set of thresholds and/or conditions defining situations in which (a) the UE 300 should send a measurement report to the network node with respect to a second access network (e.g. a RAN operating according to a different RAT, such as wireless local-area network (WLAN) 302) or (b) the UE 300 should initiate a steering of at least some traffic to the WLAN 302. It will be appreciated that in the embodiments where a measurement report is transmitted to the network node, the measurement report may include measurements of signals in the first RAT in addition to the measurements of the second RAT (e.g. WLAN).

As shown at block 720, the method continues with the sending of a second set of thresholds and/or conditions to the UE 300, the second set of thresholds and/or conditions defining situations in which, when the UE 300 is subsequently connected to the second access network (e.g. WLAN 302), (c) the UE 300 should send a measurement report to the node in the first RAN or (d) the UE 300 should initiate a steering of at least some traffic to the first RAN. In some embodiments, for example, the first RAN is a 3GPP RAN (e.g., LTE, WCDMA, HSPA or GSM).

It will be appreciated that steps 710 and 720 do not have to be performed in the order shown in FIG. 7, and they could instead be performed in the opposite order, performed in parallel or combined into a single sending step.

In embodiments where the command-based traffic steering approach described earlier is used, the method may further comprise subsequently receiving a measurement report from the UE 300, with respect to the WLAN 302, as shown at block 730. The RAN node 320 then sends a traffic steering command to the UE 300, as shown at block 740, the traffic steering command directing the UE 300 to steer at least some traffic to the WLAN 302. It will be appreciated, however, that some embodiments may use the threshold-based traffic steering approach instead. Accordingly, blocks 730 and 740 are outlined with a dashed line, indicating that these operations may not appear in all embodiments and/or instances, and are thus "optional."

In some embodiments of the method illustrated in FIG. 7, the second set of thresholds and/or conditions comprises one or more offsets to be applied to the first set of thresholds and/or conditions to determine the situations in which, when the UE 300 is subsequently connected to the second access network (e.g. WLAN 302), the UE 300 should send a measurement report to the node in the first RAN or the UE 300 should initiate a steering of at least some traffic to the first RAN. In some embodiments, the first and second sets of thresholds are at least partly non-overlapping, i.e., in that the first set of thresholds and/or conditions relates to at least one parameter that is not addressed in (in other words not contained in) the second set of thresholds and/or conditions, or vice-versa.

As suggested earlier, the second set of thresholds and/or conditions may be a "sticky" set, sent to the UE 300 as part of a modified RRC Connection release message. In some embodiments, the second set of thresholds and/or conditions include or are associated with an expiry time, the expiry time indicating a time after which an alternate set of thresholds and/or conditions should be used.

Figure 8:
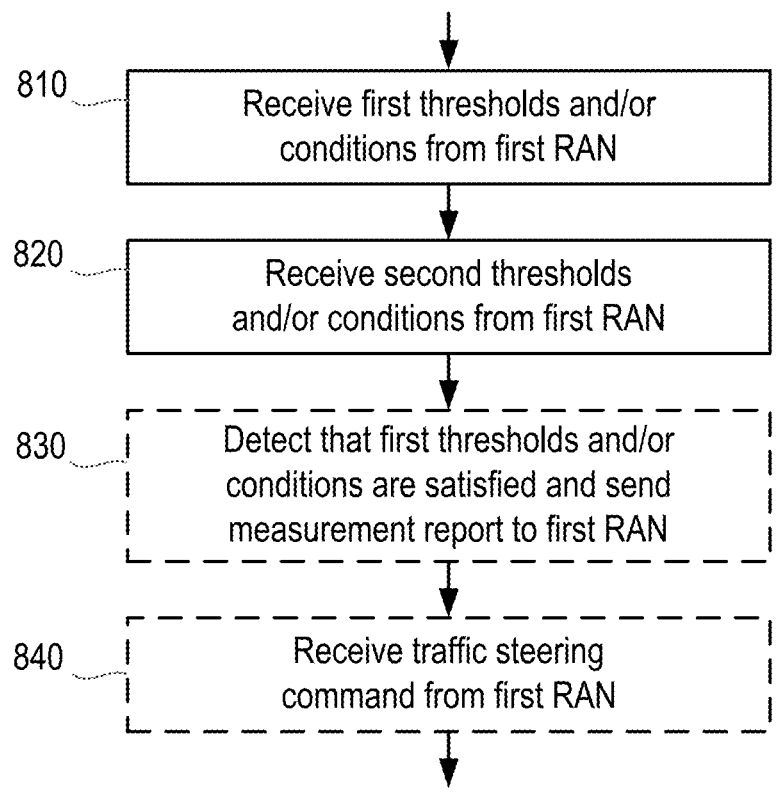
FIG. 8 is a flow chart illustrating a method in a terminal according to an embodiment.

FIG. 8 is a process flow diagram illustrating a complementary process according to some of the techniques described above, as implemented in a UE 300. As shown at block 810, the illustrated method begins with the receiving of a first set of thresholds and/or conditions from a node in a first RAN that is operating according to a first RAT, the first set of thresholds and/or conditions defining situations in which (a) the UE 300 should send a measurement report to the node in the first RAN with respect to a second access network operating according to a different RAT, such wireless local-area network (WLAN) 302, or (b) the UE 300 should initiate a steering of at least some traffic to the second access network (e.g. WLAN 302).

As shown at block 820, the method continues with the receiving of a second set of thresholds and/or conditions to the UE 300, the second set of thresholds and/or conditions defining situations in which, when the UE 300 is subsequently connected to the second access network (e.g. WLAN 302), (c) the UE 300 should send a measurement report to the first RAN or (d) the UE 300 should initiate a steering of at least some traffic to the first RAN. In some embodiments, for example, the first RAN is a 3GPP RAN (e.g., LTE, WCDMA, HSPA or GSM).

It will be appreciated that steps 810 and 820 do not have to be performed in the order shown in FIG. 8, and they could instead be performed in the opposite order, performed in parallel or combined into a single receiving step.

In embodiments where the command-based traffic steering approach described earlier is used, the method may further comprise subsequently determining that the first set of thresholds and/or conditions are met and sending a measurement report to the first RAN, with respect to the second access network (e.g. WLAN 302), as shown at block 830. This is followed by receiving a traffic steering command from the first RAN, as shown at block 840, the traffic steering command directing the UE 300 to steer at least some traffic to the second access network (e.g. WLAN 302). It will be appreciated, however, that some embodiments may use the threshold-based traffic steering approach instead. Accordingly, blocks 730 and 740 are outlined with a dashed line, indicating that these operations may not appear in all embodiments and/or instances, and are thus "optional."

In embodiments where the threshold-based steering approach described earlier is used, for example, the method may instead further comprise subsequently determining that the first set of thresholds and/or conditions are met, and autonomously initiating the steering of at least some traffic to the second access network (e.g. WLAN 302).

In several embodiments, when the UE 300 is subsequently connected to the WLAN 302 (or other type of RAN), it may determine that the first set of thresholds and/or conditions are met and send a measurement report to the first network. The UE 300 in these cases may then receive a traffic steering command from the first network, the traffic steering command directing the UE 300 to steer at least some traffic to the first RAN. Likewise, when a threshold-based approach is taken, the UE 300 may, in some embodiments, subsequently determine that the second set of thresholds and/or conditions are met, and autonomously initiate the steering of at least some traffic to the first RAN. As noted above, some embodiments may employ a mixture of the threshold-based and command-based approach, e.g., using the command-based approach for steering traffic from the first RAN to the second access network (e.g. WLAN 302) and the threshold-based approach when steering traffic back from the second access network (e.g. WLAN 302) to the first RAN.

Apparatus

Although the described solutions may be implemented in any appropriate type of telecommunication system supporting any suitable communication standards and using any suitable components, network-based embodiments of the described solutions may be implemented in one or more nodes of a radio access network (RAN), such as a node in a 3GPP RAN, such as LTE. These nodes include, but are not limited to, an eNodeB in an LTE network, or a base station or RNC in a UMTS network.

The network in which these techniques are implemented may further include any additional elements suitable to support communication between wireless devices or between a wireless device and another communication device (such as a landline telephone). Although the illustrated network nodes may represent a network communication device that includes any suitable combination of hardware and/or software, these network nodes may, in particular embodiments, represent a device such as the example network node 900 illustrated in greater detail by FIG. 9. Similarly, although the illustrated base station nodes (e.g., an eNB) may represent network nodes that include any suitable combination of hardware and/or software, these network nodes may, in particular embodiments, represent devices such as the example network node 1000 illustrated in greater detail by FIG. 10.

Figure 9:
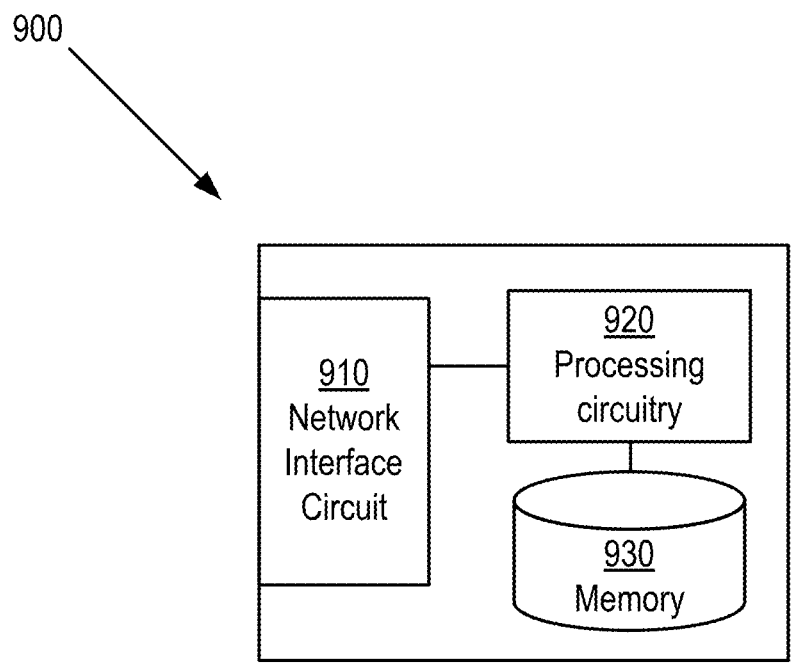
FIG. 9 is a block diagram of an exemplary network node.

As shown in FIG. 9, the example network node 900 includes processing circuitry 920, a memory 930, and network interface circuitry 910. In particular embodiments, some or all of the functionality described above as being provided by a core network node or a node in a RAN may be provided by the processing circuitry 920 executing instructions stored on a computer-readable medium, such as the memory 930 shown in FIG. 9. Alternative embodiments of the network node 900 may include additional components beyond those shown in FIG. 9 that may be responsible for providing certain aspects of the node's functionality, including any of the functionality described above and/or any functionality necessary to support the solutions described above.

Figure 10:
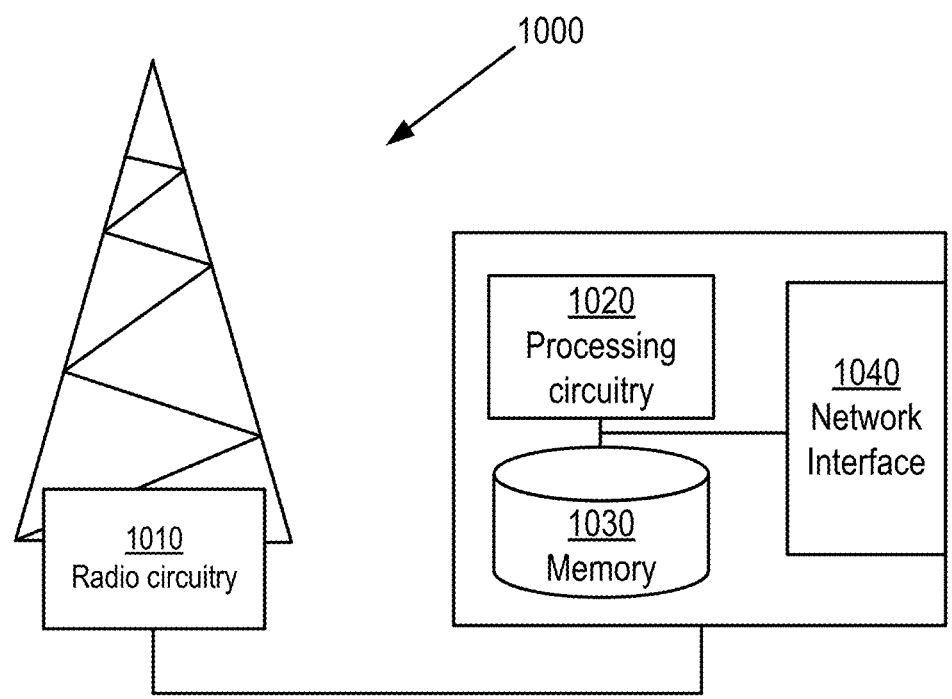
FIG. 10 is a block diagram of an exemplary base station.

As shown in FIG. 10, an example base station 1000 includes processing circuitry 1020, a memory 1030, radio circuitry 1010, and at least one antenna. The processing circuitry 1020 may comprise RF circuitry and baseband processing circuitry (not shown). In particular embodiments, some or all of the functionality described above as being provided by a mobile base station, a radio network controller, a base station controller, a relay node, a NodeB, an enhanced NodeB, and/or any other type of mobile communications node may be provided by the processing circuitry 1020 executing instructions stored on a computer-readable medium, such as the memory 1030 shown in FIG. 10. Alternative embodiments of the network node 1000 may include additional components responsible for providing additional functionality, including any of the functionality identified above and/or any functionality necessary to support the solution described above.

Figure 11:
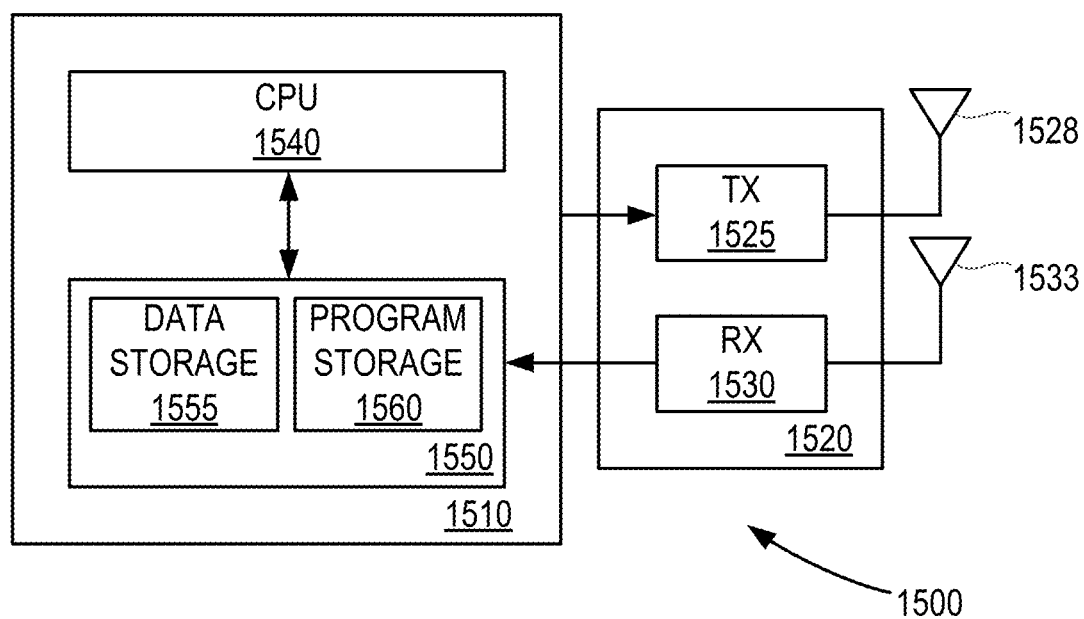
FIG. 11 is a block diagram of an exemplary terminal.

Several of the terminal-based techniques and methods described above may be implemented using radio circuitry and electronic data processing circuitry provided in a terminal. FIG. 11 illustrates features of an example terminal 1500 according to several embodiments of the present invention. Terminal 1500, which may be a UE configured for operation with an LTE network (E-UTRAN) and that also supports Wi-Fi, for example, comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 11, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1510 include modulation and coding of transmitted signals and the demodulation and decoding of received signals. In several embodiments of the disclosed techniques, processing circuit 1510 is adapted, using suitable program code stored in program storage memory 1560, for example, to carry out one of the techniques described above for access network selection. Of course, it will be appreciated that not all of the steps of these techniques are necessarily performed in a single microprocessor or even in a single module.

It will be appreciated by the person of skill in the art that various modifications may be made to the above described embodiments without departing from the scope of the presently disclosed techniques. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above and are summarized below, with reference to the attached illustrations of specific embodiments. Because it is not possible, of course, to describe every conceivable combination of components or techniques, those skilled in the art will appreciate that the presently disclosed techniques can be implemented in other ways than those specifically set forth herein. The present embodiments are thus to be considered in all respects as illustrative and not restrictive.

The invention claimed is:

1. A method for a network node of a 3GPP radio access network (RAN), the method comprising:
    determining a configuration that enables a user equipment (UE) to steer the UE's traffic between the 3GPP RAN and a wireless local area network (WLAN) without receiving a traffic steering command from the 3GPP RAN, the configuration comprising:
        a forward traffic steering configuration comprising a first plurality of thresholds and/or conditions for which the UE, when connected to the 3GPP RAN, can initiate steering at least some of the UE's traffic from the 3GPP RAN to the WLAN; and
        a backward traffic steering configuration comprising a second plurality of thresholds and/or conditions for which the UE, when connected to the WLAN, can initiate steering at least some of the UE's traffic from the WLAN to the 3GPP RAN,
        wherein the backward traffic steering configuration includes one or more thresholds and/or conditions that are based on different values of a same parameter as one or more thresholds and/or conditions of the forward traffic steering configuration; and
    sending the configuration to the UE in a single message.

2. The method of claim 1, wherein the forward traffic steering configuration and the backward traffic steering configuration are determined based on loading conditions in the 3GPP RAN.

3. The method of claim 1, wherein determining the configuration comprises adjusting one or more of the following based on an increase in loading in the 3GPP RAN:
    the first plurality of thresholds and/or conditions, to increase likelihood of the UE initiating steering of at least some of the UE's traffic from the 3GPP RAN to the WLAN; and
    the second plurality of thresholds and/or conditions, to reduce likelihood of the UE initiating steering of at least some of the UE's traffic from the WLAN to the 3GPP RAN.

4. The method of claim 1, wherein each of the forward traffic steering configuration and the backward traffic steering configuration includes thresholds and/or conditions associated with at least two of the following parameters:
    3GPP RAN reference signal received power (RSRP);
    3GPP RAN received signal quality (RSRQ);
    WLAN received signal strength (RSSI);
    WLAN air interface traffic load associated with a basic service set (BSS); and
    WLAN backhaul traffic load.

5. The method of claim 4, wherein:
    the first plurality of thresholds and/or conditions are respective first values associated with the at least two parameters; and
    the second plurality of thresholds and/or conditions are respective second values associated with the same at least two parameters.

6. The method of claim 4, wherein at least one threshold and/or condition of one of the first and second pluralities is associated with a different one of the parameters than any of the thresholds and/or conditions of the other of the first and second pluralities.

7. A method for a user equipment (UE) configured to communicate with a 3GPP radio access network (RAN) and a wireless local area network (WLAN), the method comprising:
    receiving, in a single message from the 3GPP RAN, a configuration that enables the UE to steer the UE's traffic between the 3GPP RAN and the WLAN without receiving a traffic steering command from the 3GPP RAN, the configuration comprising:
        a forward traffic steering configuration comprising a first plurality of thresholds and/or conditions for which the UE, when connected to the 3GPP RAN, can initiate steering at least some of the UE's traffic from the 3GPP RAN to the WLAN; and a backward traffic steering configuration comprising a second plurality of thresholds and/or conditions for which the UE, when connected to the WLAN, can initiate steering at least some of the UE's traffic from the WLAN to the 3GPP RAN,
wherein the backward traffic steering configuration includes one or more thresholds and/or conditions that are based on different values of a same parameter as one or more thresholds and/or conditions of the forward traffic steering configuration; and
determining that one or more thresholds and/or conditions of the forward traffic steering configuration or of the backward traffic steering configuration have been met, and in response to the determining and without receiving a traffic steering command from the 3GPP RAN, steering at least some of the UE's traffic to the 3GPP RAN or to the WLAN.

8. The method of claim 7, wherein the forward traffic steering configuration and the backward traffic steering configuration are based on loading conditions in the 3GPP RAN.

9. The method of claim 7, wherein each of the forward traffic steering configuration and the backward traffic steering configuration includes thresholds and/or conditions associated with at least two of the following parameters:
3GPP RAN reference signal received power (RSRP);
3GPP RAN received signal quality (RSRQ);
WLAN received signal strength (RSSI);
WLAN air interface traffic load associated with a basic service set (BSS); and
WLAN backhaul traffic load.

10. The method of claim 9, wherein:
the first plurality of thresholds and/or conditions are respective first values associated with the at least two parameters; and
the second plurality of thresholds and/or conditions are respective second values associated with the same at least two parameters.

11. The method of claim 9, wherein at least one threshold and/or condition of one of the first and second pluralities is associated with a different one of the parameters than any of the thresholds and/or conditions of the other of the first and second pluralities.

12. The method of claim 7, wherein:
steering traffic to the WLAN is based on determining that the first plurality of thresholds and/or conditions have been met; and
steering traffic to the 3GPP RAN is based on determining that the second plurality of thresholds and/or conditions have been met.

13. A network node configured for operation in a 3GPP radio access network (RAN), the network node comprising processing circuitry configured to:
determine a configuration that enables a user equipment (UE) to steer the UE's traffic between the 3GPP RAN and a wireless local area network (WLAN) without receiving a traffic steering command from the 3GPP RAN, the configuration comprising:
a forward traffic steering configuration comprising a first plurality of thresholds and/or conditions for which the UE, when connected to the 3GPP RAN, can initiate steering at least some of the UE's traffic from the 3GPP RAN to the WLAN; and
a backward traffic steering configuration comprising a second plurality of thresholds and/or conditions for which the UE, when connected to the WLAN, can initiate steering at least some of the UE's traffic from the WLAN to the 3GPP RAN,
wherein the backward traffic steering configuration includes one or more thresholds and/or conditions that are based on different values of a same parameter as one or more thresholds and/or conditions of the forward traffic steering configuration; and
send the configuration to the UE in a single message.

14. The network node of claim 13, wherein the forward traffic steering configuration and the backward traffic steering configuration are determined based on loading conditions in the 3GPP RAN.

15. The network node of claim 13, wherein the processing circuitry is configured to determine the configuration by adjusting one or more of the following based on an increase in loading in the 3GPP RAN:
the first plurality of thresholds and/or conditions, to increase likelihood of the UE initiating steering of at least some of the UE's traffic from the 3GPP RAN to the WLAN; and
the second plurality of thresholds and/or conditions, to reduce likelihood of the UE initiating steering of at least some of the UE's traffic from the WLAN to the 3GPP RAN.

16. The network node of claim 13, wherein each of the forward traffic steering configuration and the backward traffic steering configuration includes thresholds and/or conditions associated with at least two of the following parameters:
3GPP RAN reference signal received power (RSRP);
3GPP RAN received signal quality (RSRQ);
WLAN received signal strength (RSSI);
WLAN air interface traffic load associated with a basic service set (BSS); and
WLAN backhaul traffic load.

17. The network node of claim 16, wherein:
the first plurality of thresholds and/or conditions are respective first values associated with the at least two parameters; and
the second plurality of thresholds and/or conditions are respective second values associated with the same at least two parameters.

18. The network node of claim 16, wherein at least one threshold and/or condition of one of the first and second pluralities is associated with a different one of the parameters than any of the thresholds and/or conditions of the other of the first and second pluralities.

19. A user equipment (UE) comprising:
a radio transceiver configured to communicate with a 3GPP radio access network (RAN) and with a wireless local area network (WLAN); and
a processing circuit operably coupled to the radio transceiver, whereby the processing circuitry and the radio transceiver are configured to perform operations corresponding to the method of claim 7.

20. The UE of claim 19, wherein the forward traffic steering configuration and the backward traffic steering configuration are based on loading conditions in the 3GPP RAN.

21. The UE of claim 19, wherein each of the forward traffic steering configuration and the backward traffic steering configuration includes thresholds and/or conditions associated with at least two of the following parameters:
3GPP RAN reference signal received power (RSRP);
3GPP RAN received signal quality (RSRQ);
WLAN received signal strength (RSSI);

WLAN air interface traffic load associated with a basic service set (BSS); and

WLAN backhaul traffic load.

22. The UE of claim 21, wherein:
the first plurality of thresholds and/or conditions are respective first values associated with the at least two parameters; and
the second plurality of thresholds and/or conditions are respective second values associated with the same at least two parameters.

23. The UE of claim 21, wherein at least one threshold and/or condition of one of the first and second pluralities is associated with a different one of the parameters than any of the thresholds and/or conditions of the other of the first and second pluralities.

24. The UE of claim 19, wherein the processing circuitry is configured to:
steer traffic to the WLAN based on determining that the first plurality of thresholds and/or conditions have been met; and
steer traffic to the 3GPP RAN based on determining that the second plurality of thresholds and/or conditions have been met.

\* \* \* \* \*